United States Patent Office 3,057,345
Patented Oct. 9, 1962

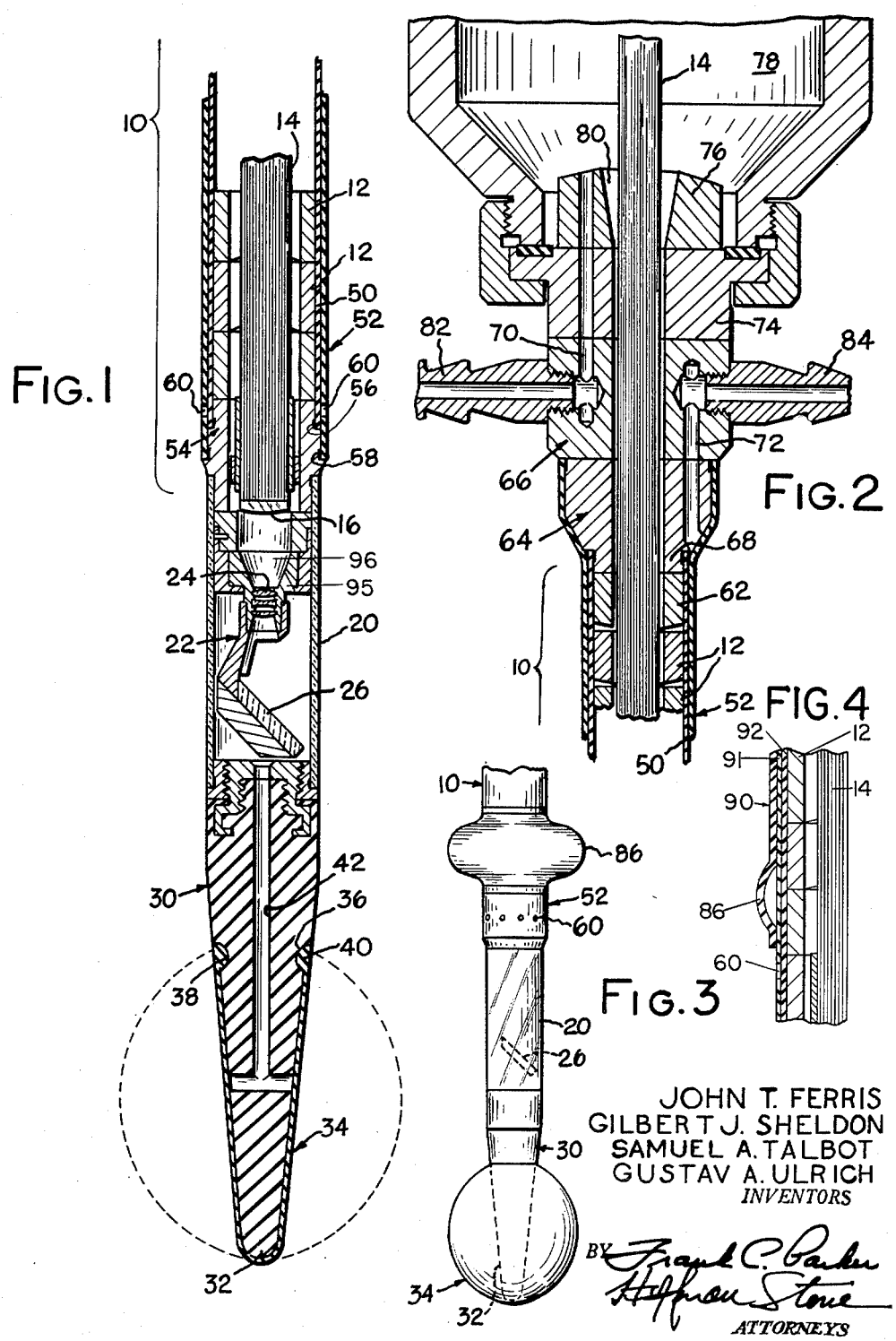
Oct. 9, 1962 — J. T. FERRIS ET AL — 3,057,345
DUODENOSCOPE
Filed May 16, 1960
JOHN T. FERRIS
GILBERT J. SHELDON
SAMUEL A. TALBOT
GUSTAV A. ULRICH
INVENTORS
ATTORNEYS

3,057,345
DUODENOSCOPE
John T. Ferris, Pittsford, and Gilbert J. Sheldon, Irondequoit, N.Y., Samuel A. Talbot, Baltimore, Md., and Gustav A. Ulrich, Rochester, N.Y., assignors to Bausch & Lomb Incorporated, a corporation of New York
Filed May 16, 1960, Ser. No. 29,264
5 Claims. (Cl. 128—8)

The present invention pertains to a novel endoscope, and, more particularly, to an improved endoscope that makes possible a complete interval visual examination of the duodenum without radical surgery.

Presently available medical statistics indicate that peptic ulcers occur in about ten percent of the United States population, and that a large majority of such ulcers are in the duodenal cap. Techniques for treating persons suffering from duodenal ulcers have been difficult to establish, partly because it has not heretofore been possible to view the duodenum without radical surgery. Moreover, it is presently estimated that between eighty and ninety percent of cancers diagnosed as stomach cancer are actually based in the duodenum. Many of these escape timely diagnosis, but probably would be recognized if they could be viewed optically. Gastroscopes are available for viewing stomach ulcers, and bronchoscopes for visual examination of the bronchi and upper lungs, but even though duodenal ulcers are among the most common of ailments, and the need for visual examination of the duodenum, and particularly of the duodenal cap for clinical and diagnostic purposes has long been recognized, duodenoscopes have been conspicuously lacking in the medical tool kit.

Accordingly, one important object of the present invention is to provide an improved endoscopic instrument useful for duodenal examination.

Other objects are: to provide a duodenoscope of novel construction including means for distending the duodenum thereby to facilitate visual examination of its walls; to provide an endoscopic instrument which is useful for the examination of the entire alimentary tract from the throat through the duodenum; to provide a compact endoscope including means for damming, or blocking up the duodenum near the lower end thereof, and means for inflating the duodenum in the region between the dam, or block and the pylorus to facilitate observation of the internal membranes; to provide an improved endoscope including means for blocking off, or occluding two spaced portions of a tubular body cavity, inflating the cavity in the region between the portions so occluded, and observing the interior surfaces of the inflated region; and in general, to provide an improved endoscopic instrument of highly flexible and extremely compact construction which is highly versatile in use and capable of providing visual access to hitherto inaccessible cavities of the body with a minimum of discomfort to the patient.

The foregoing and other objects and advantages of the invention will become apparent in the following detailed description of a preferred embodiment thereof, taken in conjunction with the drawing wherein:

FIG. 1 is a longitudinal sectional view of the distal end portion of a duodenoscope according to the present invention;

FIG. 2 is a fragmentary longitudinal view of the rear portion of the duodenoscope, particularly showing details of the passageway arrangement for introducing a working fluid for distending the duodenum or other body cavity under investigation;

FIG. 3 is a fragmentary, elevational view of the front portion of a duodenoscope according to a second embodiment of the invention; and FIG. 4 is a fragmentary cross section view of modification illustrating the three passages in the flexible portion of the endoscope.

The present invention has to do primarily with the arrangement in an endoscope for distending a body cavity by inflating it with air. Other features and constructional details of the duodenoscope illustrated in the drawing will be mentioned only briefly herein, and only to the extent necessary for a full and complete understanding of the operation of the distending arrangement. Certain ones of these other features are described and claimed in the following co-pending patent applications:

Gilbert J. Sheldon, Ser. No. 679,566, filed August 22, 1957, entitled "Flexible Tube Structures";

Gilbert J. Sheldon, Ser. No. 686,320, filed September 26, 1957, now Patent 2,975,785 issued March 21, 1961, entitled "Optical Viewing Instrument";

Gilbert J. Sheldon, Ser. No. 715,820, filed February 17, 1958, now Patent 2,987,960 issued June 13, 1961, entitled "Optical System for Endoscopes and the Like";

Gilbert J. Sheldon, Ser. No. 815,387, filed May 25, 1959, entitled "Illumination Means for Diagnostic Instrument";

John T. Ferris, Ser. No. 29,442, filed concurrently herewith, entitled "Illumination System for Endoscopes and the Like";

John T. Ferris et al., Ser. No. 29,417, filed concurrently herewith, entitled "Improved Endoscope Illumination";

Gilbert J. Sheldon et al., Ser. No. 29,416, filed concurrently herewith, entitled "Focusing Endoscope";

Gustav A. Ulrich, Ser. No. 29,255, filed concurrently herewith, entitled "Holder for Camera and Viewing Device";

Gustav A. Ulrich, Ser. No. 29,443, filed concurrently herewith, entitled "Bidirectionally Flexible Segmented Tube."

The practice of the present invention is not limited to the particular construction illustrated herein and in the above identified co-pending applications, but is believed to be of advantage in connection with duodenoscopes and other types of endoscopes of various different constructions.

Briefly, the present invention contemplates an endoscope having two separate longitudinal air passageways. The first passageway extends down to the tip of the endoscope and communicates thereat with the interior of an inflatable bulb, which is made of an elastomeric sheet material, and which may be inflated at a desired point such as in the duodenum below the duodenal cap to block off the duodenal cap from the remaining portion of the duodenum when it is desired to inflate the duodenal cap. The second passageway terminates near the front end of the endoscope and opens exteriorly thereof. Air may be forced through the second passageway for inflating the duodenal cap after the lower end of the duodenum has been stoppered by the inflatable bulb. The pyloric sphincter seizes upon the endoscope above the outlet of the second passageway with sufficient strength to retain adequate air pressure within the duodenum.

In the preferred embodiment, the first passageway, for inflating the inflatable bulb, is the central passageway of the duodenoscope within which the optical image transmitting components are contained. This passageway is sealed and rendered air tight over most of its length by an elastomeric sleeve, or sheath. The second passageway, for inflating the duodenum or other cavity under investigation, is formed by placing a second sheath of elastomeric material over the first one so that normally it lies smoothly thereagainst. When a working fluid such as air is forced between the two sheaths at the rear, or control end of the instrument, the outer sheath dilates slightly, creating a space between the two sheaths and permitting the working fluid to travel the length of the instrument therebetween and to escape near the front of the instrument.

The arrangement is extremely compact, yet relatively simple in construction and easy to assemble. Substantially no bulk is added to the basic instrument, since the sheaths may be made of relatively thin material, and at least one such sheath would ordinarily be required merely for protecting the working parts of the instrument from corrosion and the like even if no provision were made for conducting a working fluid through it.

The invention also contemplates the provision of one or more further passageways coextensive with the flexible portion of the endoscope for inflating one or more auxiliary bulbs which may be spaced rearwardly from the tip of the endoscope. The auxiliary bulb, or bulbs would serve to occlude the body cavity at a second point spaced rearwardly from the tip, so that a selected region of a body cavity such as the esophagus may be blocked off or occluded at both ends and inflated for examination.

Referring now to the drawing, the duodenoscope shown therein includes a flexible, elongated light transmitting portion 10 made up of a relatively large number of articulated tubular segments 12. Means (not shown) are preferably provided for controllably flexing the forward part of the flexible portion 10 for guiding the instrument into its desired position in the body. A light image transmitting system, preferably in the form of a coherent bundle 14 of glass fibers is disposed within the flexible portion 10 for transmitting a light image therethrough. As illustrated, a field lens 16 is fixed upon the front end of the fiber bundle 14 for directing the image rays into the bundle.

A cylindrical transparent window 20 is sealed upon and extends forwardly from the front end of the flexible portion 10, and an objective assembly 22 is mounted within the window 20. The objective assembly 22 is rotatably secured upon the front end of the tubular portion 10 for scanning the field around the window 20. The objective assembly 22 includes an objective lens 24 and an inclined mirror 26, which is disposed in front of and at any desired angle relative to the optical axis of the lens 24. Means (not shown) are provided for controllably rotating the objective assembly 22 to achieve a full 360° scan of the field surrounding the window 20.

A relatively soft and flexible guide, or finger 30 is sealed to and extends forwardly from the front end of the window 20, serving also as a front closure for the window. The flexible finger 30 is preferably relatively short, and may be, for example, between about one and two inches in length. It is made of an elastomer soft enough to minimize the possibility of tissue damage and discomfort to the patient, but stiff enough to act as a guide or pilot. It is tapered to a relatively narrow, rounded front end 32 to facilitate its entry into constricted portions of the body such as the sphincters.

An inflatable bulb 34 is fitted over the front end 32 of the finger for stoppering the duodenum below the duodenal cap when the endoscope is placed in the duodenum.

The bulb 34 is made of a relatively thin, elastomeric sheet material, and is sealed at its open end 36 to the finger 30. Preferably, the finger 30 is formed with a groove 38 for receiving a thickened ring-like annular portion 40 of the bulb for maximum security of attachment. Preferably, also, a suitable cement (not shown) is applied at the point of attachment such as in the groove 38 for positively securing the bulb 34 to the finger 30. A passage 95 is in communication with chamber 96 and the interior of the window 20. A passageway 42 extends through the finger 30 from the rear thereof, where it communicates with the interior of the window 20, to a sidewall position where it opens into the interior of the bulb 34. Pressure air introduced into the window 20 is thus directed to the bulb 34 for inflating it. Normally the bulb lies smoothly and tightly in slightly stretched condition upon the forward end of the flexible finger 30.

As hereinabove stated, the flexible, light-image transmitting portion 10 of the endoscope is covered with two sheaths 50 and 52, which are made of an elastomeric material and fitted snugly over the flexible portion 10, being co-extensive therewith. The terminal segment 54 of the flexible portion is preferably formed with two relatively narrow, annular recesses 56 and 58 within which the ends of the sheaths 50 and 52, respectively, fit, thus providing a smooth external configuration for the instrument and protecting the front edges of the sheaths against catching upon surfaces, or any other action that might tend to roll them back upon themselves. The terminal portions of the sheaths are preferably cemented in place for added security. A series of angularly spaced apertures 60 extend through the outer sheath 52 to permit the outward escape of air from between the two sheaths.

The arrangement at the rear, or control end of the endoscope is illustrated in FIG. 2, wherein it will be seen that the rearmost one 62 of the tubular segments is fixed as by brazing to an intermediate connecting member 64, which in turn is secured to a manifold 66. The inner sheath 50 extends over the rearmost segment 62, preferably being cemented thereon, and may also be cemented to the lower end portion 68 of the intermediate member 64. The outer sheath 52 extends rearwardly beyond the end of the inner sheath 50, over the intermediate member 64 and is cemented around the rear thereof.

The manifold 66 includes two inlet passageways 70 and 72, the first one of which extends rearwardly through a connecting member 74 and a cap 76 to a sealed chamber 78, which opens into the central bore 80 of the flexible tubular portion 10 of the endoscope. The second passageway 72 extends forwardly through the intermediate connector 64 and opens exteriorly thereof at a point to the rear of the inner sheath 50 and forward of the cemented portion of the outer sheath 52. Inlet nipples 82 and 84 are connected to the manifold 66 for securing hoses or the like (not shown) for introducing a working fluid such as pressure air into the passageways 70 and 72, respectively.

Various other parts of the endoscope which are not shown herein may be mounted within the chamber 78 such as, for example, an optical viewing device for viewing the image transmitted by the fiber bundle 14, and control mechanisms for controllably flexing the tubular portion 10 and rotating the objective assembly 22. These arrangements do not form part of the present invention, and may be varied as desired.

An alternate construction is illustrated in FIG. 3 for aid in investigating selected portions of body tubes such as the esophagus, which are open at both ends, or which are open at the proximal end. In the construction, the endoscope includes an inflatable cuff 86 around the flexible portion 10 spaced a short distance rearwardly from the window 20. A third passageway extends along the flexible portion 10 for inflating the cuff 86 independently of the bulb 34. The third passageway may be formed by adding a third sheath over the second sheath 52, by inserting a relatively thin wall tube between the thin sheaths 50 and 52, or by sub-dividing the space between the sheaths 50 and 52 such as by cementing them together along two or more longitudinal and extending and angularly spaced lines. As illustrated in FIG. 4 the first method using the addition of a third sheath over the second sheath 52 is used.

Referring to FIG. 4 the fragmentary section illustrates the plurality of passages in a modification. This modification is illustrated in a side elevation view in FIG. 3. Three elastomeric sheaths are illustrated forming the plurality of passages. The first sheath 90 forms a passage means with the second sheath 91. The forward end of the elastomeric sheath 90 is bonded to the outer periphery of the sheath 91. The lower portion of the sheath 90 is more resilient than the upper portion and thereby forms a bulb 86 when inflated with pressurized fluid.

The intermediate sheath 91 and the sheath 92 form a second passage. The second passage is normally closed as the sheath 91 contracts about the outer periphery of sheath 92. As pressurized fluid is admitted between the sheath 91 and 92 the sheath 91 is distended forming a passage to accommodate the flow of pressurized fluid which is expelled through the plurality of openings 60 on the intermediate sheath 91. The third passage is formed by the inner periphery of the plurality of segments 12, and sealed by sheath 92. This passage leads centrally through the flexible portion 10 around objective lens means 24, and through the passage 42. The passage 42 is in communication with the inner portion of the bulb 34. In this manner the cuff 86, and the bulb 34 may be inflated independently. A pressurized fluid is admitted between the sheath 91 and 92 to provide inflation of the body cavity independently of bulb and cuff inflation.

In operation, the endoscope is inserted into the body cavity it is desired to view until the viewing window 20 is at the desired location for observation. In the esophagus, bronchi, or stomach, satisfactory observations may usually be made merely by rotating the objective assembly 22 to survey the desired field. The stomach may also be inflated by admitting pressure air into the second manifold 72 for transmission between the two sheaths 50 and 52 along the length of the flexible portion 10 and out through the exit apertures 60 in the outer sheath 52. The air so admitted dilates the outer sheath 52 slightly as it travels along the length of the flexible portion 10, thus opening up a passageway between the two sheaths.

For inflation of the duodenal cap, the distal end thereof must be stoppered, or dammed up to prevent the escape of the pressurized air into the lower duodenum. At the upper end of the duodenal cap the pyloric sphincter seizes the flexible portion 10 of the endoscope sufficiently tightly to provide a relatively air-tight seal, but at the lower end there is no constriction, and air introduced through the space between the sheaths 50 and 52 would escape into the upper intestine without appreciably dilating the duodenum. Therefore, before it is attempted to inflate the duodenal cap, the lower part of the duodenal cap is stoppered by admitting pressurized air into the first passageway 70 for travel through the main bore of the flexible tubular portion 10, the window 20, and the passageway 42 in the flexible finger to inflate the bulb 34 into tight sealing engagement in the duodenum. Pressurized air is then admitted through the normally closed passageway between the two sheaths 50 and 52 to inflate the duodenal cap for full examination.

What is claimed is:

1. An endoscope comprising an elongated flexible light image transmitting portion, optical objective means rotatably mounted at the front end of said portion for forming an optical image for transmission through said portion to the rear thereof, a panoramic window enclosing said objective means to permit 360° vision, a finger mounted in front of said objective means, an elastomeric membrane fastened around said finger and sealed thereto so as to define a closed expansible chamber in conjunction with said finger, and passageway means extending along said flexible portion and said objective means and through said finger for conducting a working fluid from the rear of said flexible portion into said chamber for controllably expanding it an thereby occluding a body passageway when said endoscope has been inserted therein said inflated membrane thereby substantially centering the objective means within the body passageway to provide substantially constant viewing distance of the passage walls.

2. A flexible endoscope for remote observation of a body cavity such as the duodenum comprising a flexible elongated tubular portion, an image forming means rotatably mounted on the forward end of said tubular portion, a light image transmitting device within said portion receiving an image from said image forming means, a cylindrical window enclosing said image forming means permitting panoramic scanning, means defining two separate passageways along the length of said portion, one of said passageways formed by flexible sheaths and opening exteriorly of said portion for inflating a body cavity into which the endoscope is inserted, an inflatable bulb fastened and sealed at the front of said tubular portion and coaxial therewith for stoppering or damming up a body vessel, the other one of said passageways formed by said flexible tubular portion and opening into said bulb for inflating it.

3. A flexible endoscope for use in remote observation of the interior of a body cavity such as the duodenum comprising a flexible tubular portion, a light image transmitting device within said portion, a peripheral window on the forward end of said tubular portion, an image forming means rotatably mounted within said window scanning the field surrounding said window, sealing means sealing said portion for containing a pressurized fluid therein, an inflatable bulb fastened at the front of said endoscope and opening into said flexible portion whereby a pressurized fluid introduced at the rear of said portion travels through said portion to and inflates said bulb, and means defining a fluid conducting passageway exteriorly of said portion and coextensive therewith, said passageway opening at the front of said portion exteriorly thereof.

4. A flexible endoscope for remote observation of the duodenum and like cavities comprising a flexible elongated tubular portion, a light image transmitting device within said portion, optical objective means rotatably mounted on said tubular portion forming an image on said image transmitting device, a tubular window enclosing said objective means and permitting panoramic scanning by said objective means, means defining two separate passageways along the length of said portion, one of said passageways opening exteriorly of said portion for inflating a body cavity into which the endoscope is inserted, and an inflatable bulb fastened at the front of said tubular portion and coaxial therewith for stoppering or damming up a body vessel, the other one of said passageways opening into said bulb for inflating it, said means defining the two passageways forming coaxial passages and including a pair of coextensive elastomeric sheaths extending along and covering said tubular portion to form the first one of said passages, the outer one of said sheaths normally lying in contact with the inner one thereof and being distensible to permit the passage of a working fluid between said sheaths.

5. A flexible endoscope comprising a flexible elongated tubular portion, a light image transmitting device within said portion, optical objective means rotatably mounted at the front of said portion for producing an optical image for transmission to the rear of said portion by said device, a transparent housing encircling said optical objective means defining three separate passageways extending along said portion, an inflatable cuff around said portion rearward of said objective means, a first one of said passageways opening into said cuff, an inflatable bulb forward of said objective means, a second one of said passages in communication with said bulb, the third one of said passageways opening exteriorly of the endoscope between said cuff and said bulb, and means for admitting a pressurized fluid into said passageways at the rear of said portion for selectively inflating said cuff and said bulb and for conducting pressurized fluid into a region between said cuff and said bulb, thereby controlling the radial distance of said passage walls from said objective means.

References Cited in the file of this patent

UNITED STATES PATENTS

| | | |
|---|---|---|
| 1,727,495 | Wappler | Sept. 10, 1929 |
| 1,922,084 | Gerow | Aug. 15, 1933 |
| 2,325,831 | Cameron | Aug. 3, 1943 |
| 2,548,602 | Greenburg | Apr. 10, 1951 |
| 2,877,368 | Sheldon | Mar. 10, 1959 |

FOREIGN PATENTS

| | | |
|---|---|---|
| 526,643 | Germany | June 8, 1931 |
| 548,462 | Great Britain | Oct. 12, 1942 |
| 593,213 | Great Britain | Oct. 10, 1947 |

UNITED STATES PATENT OFFICE

CERTIFICATE OF CORRECTION

Patent No. 3,057,345                             October 9, 1962

John T. Ferris et al.

It is hereby certified that error appears in the above numbered patent requiring correction and that the said Letters Patent should read as corrected below.

Column 1, line 12, for "interval" read -- internal --; column 6, line 2, for "an" read -- and --; line 66, between "means" and "defining" insert -- means --.

Signed and sealed this 26th day of February 1963.

(SEAL)
Attest:

ESTON G. JOHNSON
Attesting Officer

DAVID L. LADD
Commissioner of Patents